United States Patent [19]
Marcus et al.

[11] Patent Number: 6,034,774
[45] Date of Patent: Mar. 7, 2000

[54] METHOD FOR DETERMINING THE RETARDATION OF A MATERIAL USING NON-COHERENT LIGHT INTERFEROMETERY

[75] Inventors: Michael A. Marcus, Honeoye Falls; Jiann-Rong Lee, Webster, both of N.Y.

[73] Assignee: Eastman Kodak Company, Rochester, N.Y.

[21] Appl. No.: 09/105,742

[22] Filed: Jun. 26, 1998

[51] Int. Cl.[7] .................................................. G01B 9/02
[52] U.S. Cl. ......................... 356/361; 356/345; 356/357
[58] Field of Search .................................. 356/357, 345, 356/361

[56] References Cited

U.S. PATENT DOCUMENTS

| | | |
|---|---|---|
| 3,930,167 | 12/1975 | Hsiao . |
| 4,042,723 | 8/1977 | Presby . |
| 4,254,337 | 3/1981 | Yasujima et al. . |
| 4,650,329 | 3/1987 | Barrett et al. . |
| 4,799,001 | 1/1989 | Burch . |
| 4,950,074 | 8/1990 | Fabricius et al. . |
| 5,262,842 | 11/1993 | Gauglitz . |
| 5,285,424 | 2/1994 | Meyer . |
| 5,291,268 | 3/1994 | Tank et al. . |
| 5,323,229 | 6/1994 | May et al. . |
| 5,473,432 | 12/1995 | Sorin . |
| 5,563,707 | 10/1996 | Prass et al. . |
| 5,596,409 | 1/1997 | Marcus et al. . |
| 5,610,716 | 3/1997 | Sorin et al. . |
| 5,659,392 | 8/1997 | Marcus et al. . |

FOREIGN PATENT DOCUMENTS

| | | |
|---|---|---|
| 2449475 | 4/1976 | Germany . |
| 2338305 | 10/1978 | Germany . |

OTHER PUBLICATIONS

"An interferometric method to measure transient refractive index, birefringence and thickness variation of solids." By Theocaris et al, published in Journal of Physics E, vol. 8, No. 7, pp. 611–614, Jul. 1975.

Primary Examiner—Robert H. Kim
Assistant Examiner—Andrew H. Lee
Attorney, Agent, or Firm—Susan L. Parulski

[57] ABSTRACT

A method for determining the optical retardation of an anisotropic material. A beam of light is directed toward a sample of the material and a portion of the reflected beam is collected from the optical interfaces of the material and directed toward an interferometer. The resulting interference signal is analyzed to determine the retardation. The retardation is determined as being the distance between particular peaks of the interference signal. In a further embodiment, light from multiple wavelength light sources is directed toward the sample of the material.

11 Claims, 7 Drawing Sheets

METHOD FOR DETERMINING THE RETARDATION OF A MATERIAL USING NON-COHERENT LIGHT INTERFEROMETERY

FIELD OF THE INVENTION

The present invention relates generally to optical characteristics of materials, and more particularly, to a method for determining the optical retardation of optically anisotropic materials.

BACKGROUND OF THE INVENTION

Isotropic materials have equal physical properties along all axes and are not birefringent. As such, light waves entering the isotropic material are not split into light waves of differing velocities. Accordingly, isotropic materials have a single index of refraction $\eta$.

In contrast, anisotropic materials have unequal physical properties along different axes. Optically anisotropic materials are typically birefringent. That is, light waves are split upon entry into the anisotropic material into two waves with differing velocities, and therefore, different refractive indices (e.g., $\eta_1$ and $\eta_2$). An example of an optically anisotropic material is an oriented polyester polymer film.

An optical characteristic of an anisotropic material is optical retardation. Optical retardation is defined as the product of thickness and birefringence. More particularly:

$$R=t*\text{birefringence} \qquad \text{Equation 1}$$

Written alternatively, $$R=t*(\eta_1-\eta_2) \qquad \text{Equation 2}$$

wherein:

t is thickness, $\eta_1$ is the index of refraction in a first direction, and $\eta_2$ is the index of refraction in a second direction perpendicular to the first direction.

U.S. Pat. Nos. 5,659,392 and No. 5,596,409 (Marcus et al), commonly assigned and incorporated herein by reference, teach an apparatus and method for measuring the physical properties of an object, such as thickness, group index of refraction, and distance to a surface. The apparatus includes a non-coherent light interferometer in association with a coherent light interferometer.

Non-coherent light interferometry has been used to measure physical properties of a material. For example, U.S. Pat. No. 5,610,716 (Sorin et al) relates to an apparatus and method for measuring thickness of a film of an isotropic material using an interferometer. The film thickness is obtained by determining the distance between two packets in the output of the interferometer. As referenced by Sorin to a "group index equal to $\eta$", the apparatus and method of Sorin et al is directed to an isotropic material. In addition, Sorin refers only to the measurement of thickness. As such, Sorin et al does not address measuring optical retardation since Sorin et al is not directed to anisotropic materials.

Apparatus and methods exist for determining the birefringence of a material. For example, German Patent No. DE 23 38 305 C3 (Frangen) discloses a method for determining the linear birefringence of a material, particularly in a form suitable for use in process control. Using transmission, Frangen teaches a first polarizer upstream of the material, and a second polarizer downstream of the material whose plane of polarization is perpendicular to that of the first polarizer. A photoelectrical receiving unit downstream of the second polarizer detects the wavelengths to determine birefringence. A separate thickness measuring device is provided. However, it may be desired to determine only retardation, and not the specific values of thickness and/or birefringence. Therefore, while the German apparatus may have achieved a certain level of success, it affords a complex solution to the measurement of retardation. Further, it may be desirable to determine retardation without the use of polarizing optics.

As such, a need continues to exist for a method for determining the optical retardation of an anisotropic material. The retardation should be measured directly, that is, without determining the specific values of thickness and birefringence. A suitable apparatus is preferably simple in design, transportable, compact in size, and does not utilize polarizing optics. A suitable method is robust, consistent, and provides analysis results quickly.

SUMMARY OF THE INVENTION

An object of the present invention is to provide a method for determining the optical retardation of an anisotropic material.

Another object of the present invention is to provide a method for determining retardation directly.

Yet another object of the invention is to provide such a method which does not utilize polarizing optics.

Still another object of the invention is to provide such a method that is robust and consistent.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method for determining the optical retardation of an anisotropic material having at least two optical interfaces. A beam of light is directed toward a sample of the material. The light reflected from the optical interfaces of the material is then collected and directed toward an interferometer. An interference signal is generated which is representative of the collected light. The interference signal is analyzed to determine a retardation magnitude. In another embodiment, a beam of light is directed from multiple wavelength light sources toward the sample of the material.

To analyze the interference signal to determine a retardation magnitude, a first peak of the interference signal is determined which corresponds to a zero-crossing position. Then, a first distance is determined between a second peak and the first peak, wherein the first distance corresponds to $\eta_1 t$ wherein t is thickness and $\eta_1$ is the index of refraction in a first direction. A second peak is then determined wherein the second distance between a third peak and the first peak, wherein the second distance corresponds to $\eta_2 t$ wherein $\eta_2$ is the index of refraction in a second direction perpendicular to the first direction. The retardation magnitude is determined by determining the difference between the first distance and the second distance.

The present invention provides a method for determining the retardation of an anisotropic material without determining the specific values of thickness and birefringence. The method is robust, consistent, and provides analysis results quickly.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
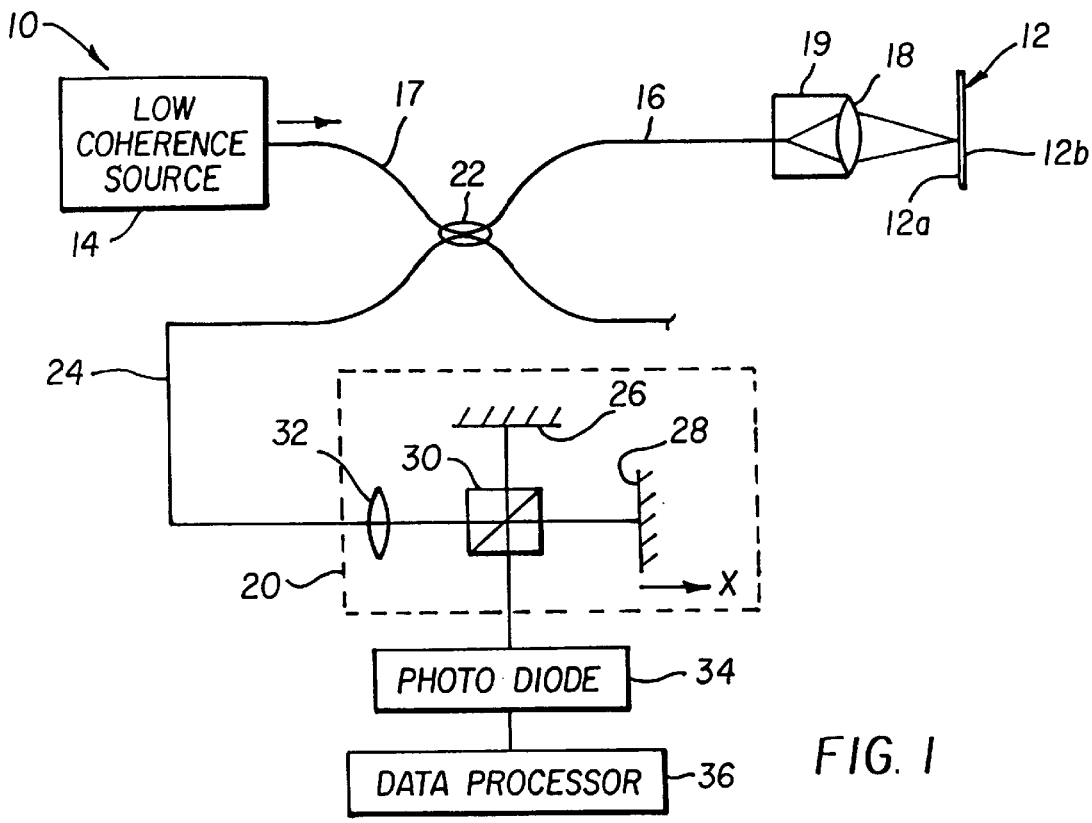
FIG. 1 shows a block diagram of a first apparatus suitable for use with a method for determining retardation of a material in accordance with the present invention.

The following is a detailed description of the preferred embodiments of the invention, reference being made to the drawings in which the same reference numerals identify the same elements of structure in each of the several figures.

An apparatus 10 suitable for use with a method for determining the retardation of an anisotropic material in accordance with the present invention is illustrated in FIG. 1.

For ease of discussion, sample 12 is illustrated and referred to as a single layer anisotropic material of thickness t having two optical interfaces (a front surface 12a and a back surface 12b). Those skilled in the art will recognize that the method of the present invention can be employed with a sample having multiple layers as well as a sample having a single layer. Further, while FIG. 1 illustrates sample 12 as a stationary material, sample 12 may also be non-stationary such as a moving web material.

Apparatus 10 illuminates sample 12 with a low coherence light generated by a low coherent light source 14, such as a light emitting diode (LED). Light from source 14 is delivered to sample 12 by means of an optical fibers 16,17, lens 18, and optical coupler 22. More particularly, light from source 14 travels along optical fiber 17, through optical coupler 22, along optical fiber 16, and passes through lens 18. Lens 18 focuses the light onto sample 12 and collects a portion of the light reflected from the optical interfaces of sample 12, which is then coupled back into fiber 16. Fiber 16 and lens 18 may optionally be coupled to a mounting apparatus 19 (such as an optical probe), as illustrated in FIG. 1. A portion of the collected light is directed to a Michelson interferometer 20 (or other optical autocorrelator or interferometer having a variable differential time delay) by means of optical coupler 22 and an optical fiber 24.

Figure 2:
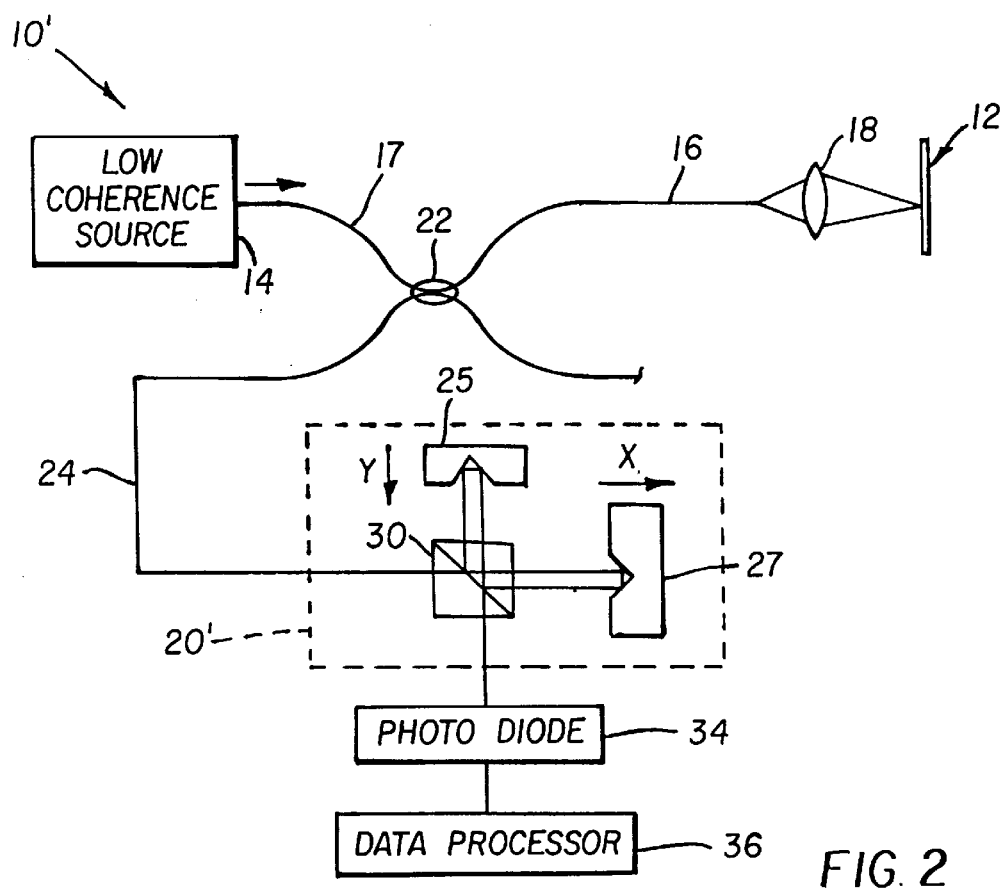
FIG. 2 shows a block diagram of a second apparatus suitable for use with a method for determining retardation of a material in accordance with the present invention.

Michelson interferometers are known to those skilled in the art, and may encompass differing embodiments. For example, the embodiment of the Michelson interferometer 20 illustrated in FIG. 1 includes a fixed retroreflector 26 (e.g., a mirror), a moveable retroreflector 28, a beam splitter 30, and a lens 32. In an alternate embodiment of the apparatus 10', illustrated in FIG. 2, a Michelson interferometer 20' includes two movable retroreflectors 25,27 which move in opposite directions in a synchronized manner. As known to those skilled in the art, retroreflectors can be utilized to vary an optical path delay between two arms (also referred to as branches) of the interferometer. For non-coherent light, constructive interference occurs when the optical path delay between the two arms of the interferometer is equal to a corresponding optical path difference between a pair of optical interfaces of the sample. Constructive interference also occurs when the optical path delay between the two arms of the interferometer is equal to substantially zero. This is generally referred to as the zero-crossing position. The width of the constructive interference peak is related to the coherence length of the source. The shorter the coherence length, the narrower the peak. Accordingly, when single layer anisotropic sample 12 (with two indexes of refraction $\eta_1, \eta_2$, and thus, two optical paths) is disposed within apparatus 10, a constructive interference will occur at optical path delays of zero, $\eta_1 t$, and $\eta_2 t$.

Referring again to FIG. 1, the light signal directed to interferometer 20 includes light reflected from the two optical interfaces (front surface f and back surface b). The directed light is split into two beams that traverse different paths by beam splitter 30. The first path is directed to fixed retroreflector 26, and the second path is directed to moveable retroreflector 28.

After traversing the first and second paths, the light is recombined by beam splitter 30 and directed to a photodiode 34 which measures the intensity of the light. An interference signal is provided representative of the intensity as a function of retroreflector relative displacement. The interference signals are processed by a data processor 36 as described below to determine a retardation magnitude and/or optical path.

Figure 3:
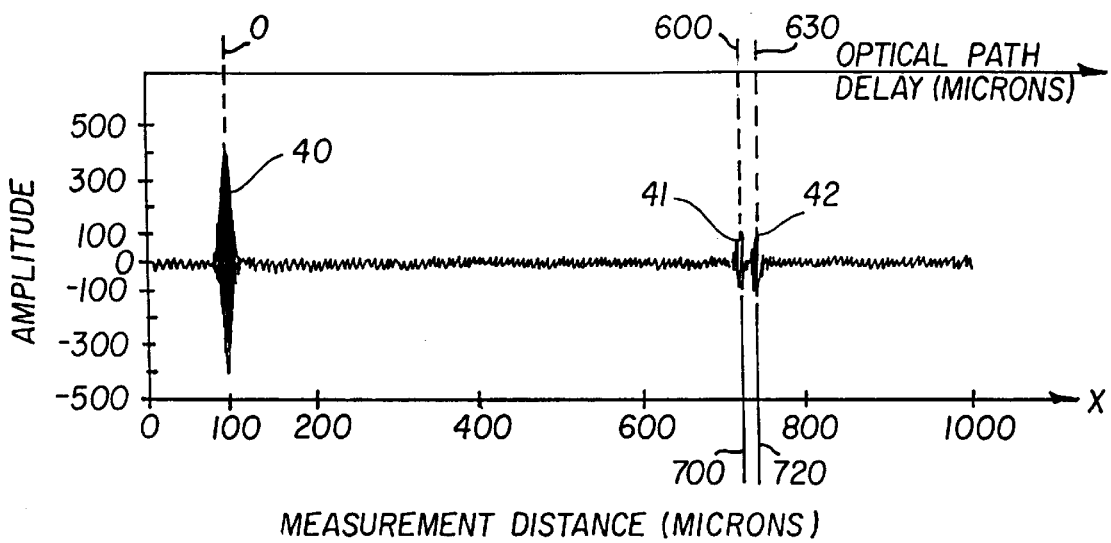
FIG. 3 shows an interference signal for illustrating the present invention.
Figure 4:
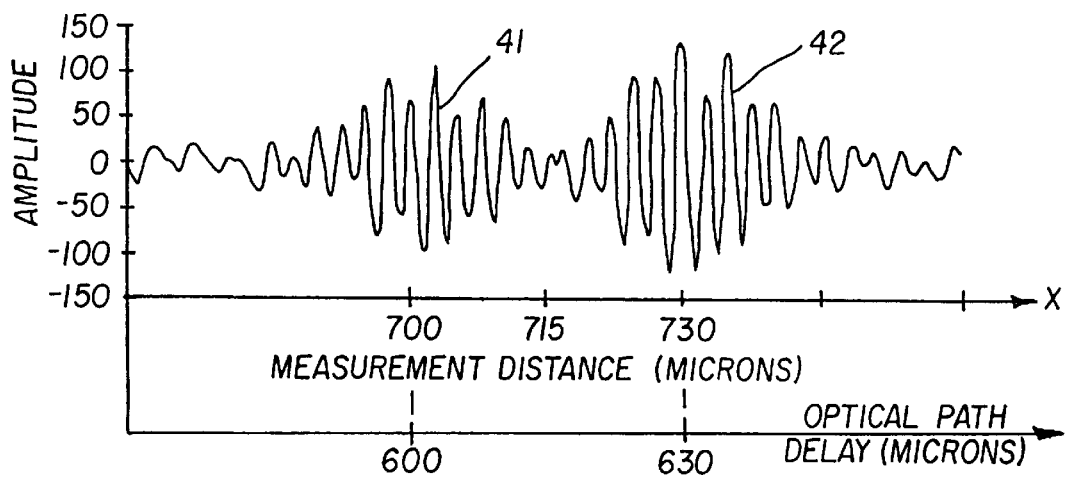
FIG. 4 shows an expanded view of a portion of the interference signal of FIG. 3.

An example of the interference signals as a function of position X (i.e., distance) is illustrated in FIGS. 3 and 4 for a sample 12. The data illustrated in FIGS. 3 and 4 relates to a 1300 nm LED light source with a 60 nm bandwidth and a 12.5 micron coherence length. Two horizontal scales are illustrated in FIGS. 3 and 4. A first scale is the optical path delay scale wherein X=0 refers to the zero-crossing position, and a second scale is the accumulated optical path difference developed in the interferometer. This intensity function has three "packets" or "bursts" of interference fringes as shown in FIG. 3 as 40–42. The center of the largest packet 40 corresponds to a zero-crossing position of interferometer 20. The zero-crossing position occurs at an interferometer optical path delay difference of 0.0 positional units (e.g., microns). Stated alternatively, the zero-crossing position results when the two optical paths of the interferometer are equal in length, and consequently, when the light from each of the reflections (of the front and back surface of sample 12) coherently interferes with itself. The two smaller packets 41,42 result from the retardation of sample 12. More particularly, these smaller packets 41,42 result from the cross interference between the reflections generated at the two surfaces of sample 12.

Applicants have determined that the distance between the centers of the two smaller packets 41,42 is a direct measurement of the retardation. Specifically, the distance between the center of largest peak 40 and the center of two smaller peaks 41,42 are $t^*n_1$, and $t^*n_2$, respectively. Thus, a measurement of retardation may be made by determining the difference between the distance of the two smaller packets from the larger packet. Stated alternatively, retardation can be determined directly from the optical path delay difference between two locations of constructive interference corresponding to $\eta_1 t$ and $\eta_2 t$.

Figure 5:
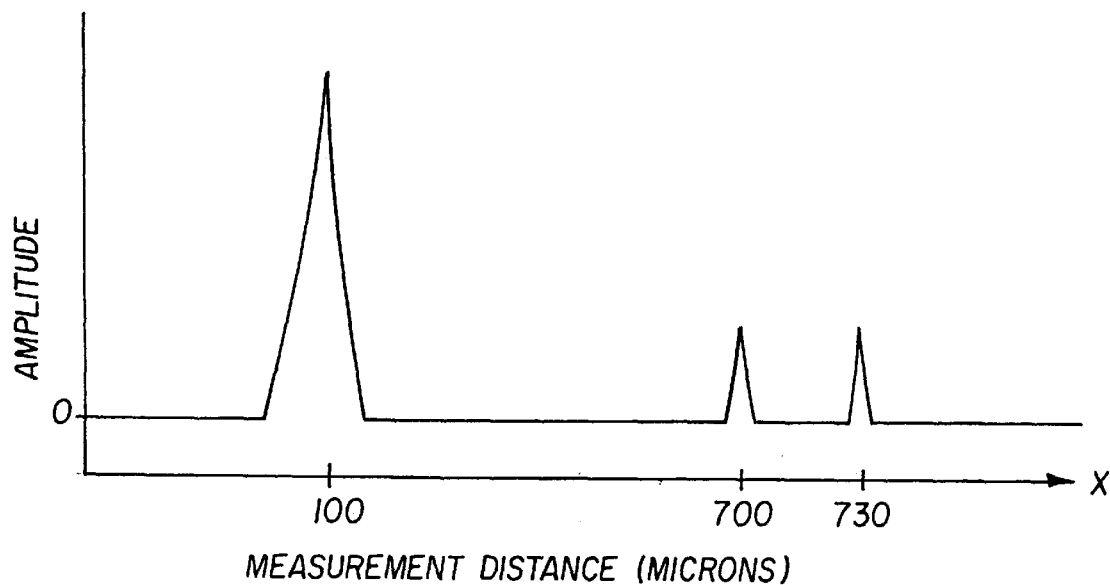
FIG. 5 shows an averaged absolute value of the interference signal of FIG. 3, illustrating the center location of the interference peaks.

For example, to determine retardation, the interference signal is first analyzed to determine a first peak corresponding to the zero-crossing position. FIG. 5 illustrates the calculated peak locations for the interferometer data of FIGS. 3 and 4. FIG. 5 illustrates the zero-crossing position to be at approximately 100 microns from the start of the optical path delay measurement. A position of the second peak is determined to be located at approximately 700 while a position of the third peak is determined to be located at approximately 730. The distance between the first peak and the second peak is 600 (i.e., 700–100), and the distance between the first peak and the third peak is 630 (i.e., 730–100). Thus, retardation is determined to be 30 microns (630–600).

Figure 6:
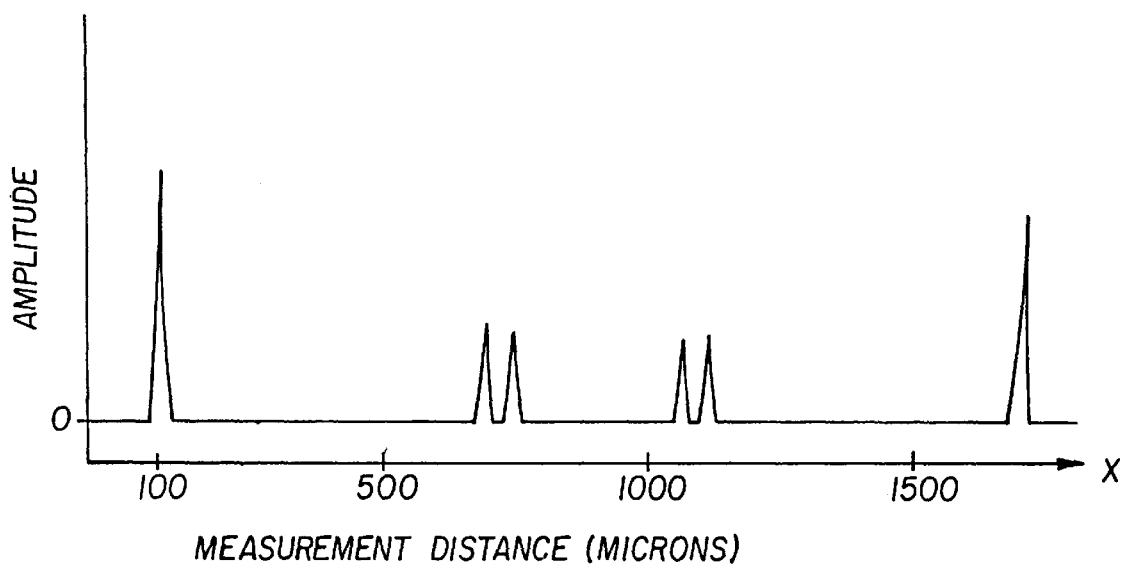
FIG. 6 shows an averaged absolute value of an interference signal for a first and second measurement, the second measurement being in a direction opposite the first measurement.

If the direction of the interferometer's optical path delay is reversed at about the 900 micron location, and the same distance is traveled in this reverse direction, a repeat peak pattern shown in FIG. 6 would be observed. As illustrated, a mirror image of the forward travel occurs about the 900 micron location. Thus, the retardation value is still determined to be about 30 microns, independent of the interferometer's travel direction. Note that the interference fringe width of a packet is determined by the effective coherence length of the light source, and this, the width of the packet can be quite large, as shown in FIG. 4, which is an expanded view of the smaller packets 41,42. Thus the accuracy of retardation is dependent on the accuracy with which the distance between the centers of the packets can be determined. Various methods may be employed for determining the center of a packet. One method is disclosed in U.S. Pat. No. 5,659,392 (Marcus et al.) and No. 5,596,409 (Marcus et al.) commonly assigned, incorporated herein by reference. Another method is disclosed in U.S. Pat. No. 5,610,716 (Sorin et al.) assigned to Hewlett-Packard Company, incorporated herein by reference. This second method is directed to determining the slope of the phase of a Fourier transform of the interference signal as a function of frequency.

If it is desired to measure both optical thickness and retardation, the interferometer must measure a distance sufficient to observe all three packets. This requires measuring from below the zero-crossing position to beyond the other two peaks. Referring to FIG. 5, this would mean scanning from below 100 microns to beyond 730 microns (on the measurement distance scale).

If the thickness of sample 12 is within a repeatable and known range, it may be sufficient to start the measurement from above the zero-crossing position and measure beyond the other two peaks. Then, retardation may be determined directly as the distance between the two scanned peaks. For FIG. 5, this would mean measuring from 700 to 730 microns (on the measurement distance scale), and determining retardation to be 730–700=30 microns.

Figure 7:
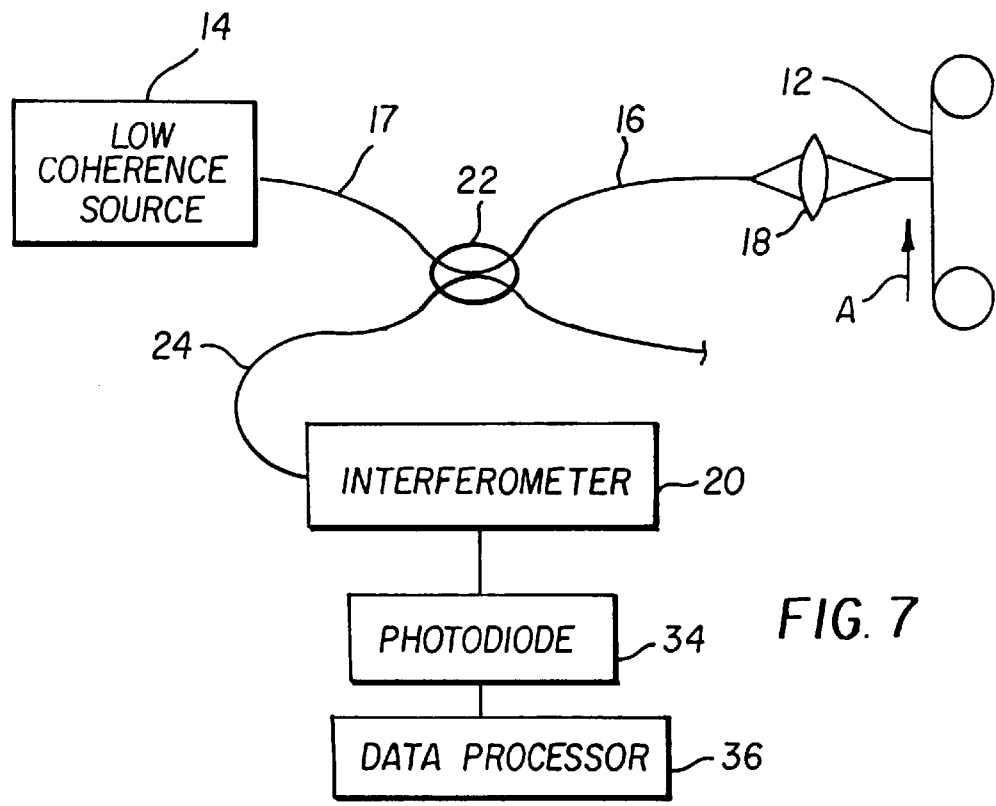
FIG. 7 shows a block diagram of the apparatus of FIG. 1 wherein the sample is a moving web material.
Figure 8:
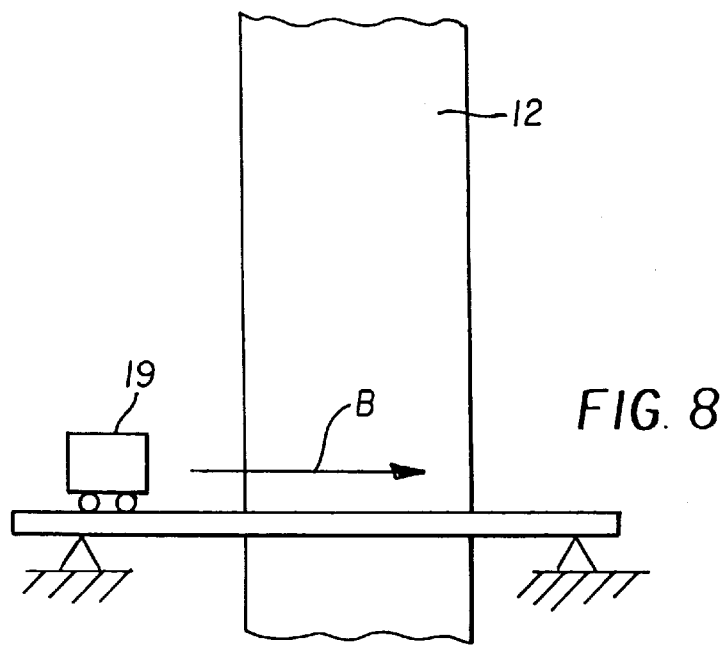
FIG. 8 shows a lens mounted for widthwise movement across a sample.

Repetitive measurements may be desired, particularly if multiple samples are to be examined or if the sample is being continuously examined in a manufacturing environment. For example, during the manufacturing of uniaxially or biaxially oriented polymeric material, it is convenient to monitor the retardation to assess the uniformity of the manufacturing process. Examples of oriented materials include copolymers, polyesters, polyethylene terepthalate (PET), poly vinylidene fluoride, polyurethanes, polyethylene, polypropylene, polyamides, polyethylene naphthalate (PEN), polychlorotrifluoroethylene and other crystalline or semicrystalline polymer systems. Both lengthwise and widthwise uniformity may be monitored. Lengthwise measurements may be made as illustrated in FIG. 7 wherein sample 12 is a web material moving in a direction shown by arrow A, permitting retardation measurements to be made along the length of the web material. Alternatively, as illustrated in FIG. 8, optical probe 19 (including lens 18) may be mounted by means known to those skilled in the art (e.g., a transport stage scanning frame) to move along the width of sample 12 in a direction shown by arrow B, thereby permitting retardation measurements to be made in the widthwise direction.

For on-line manufacturing measurements, the optical path delay of the interferometer is repetitively varied over a distance interval sufficient for the measurement of interest. The retroreflectors are alternately moved in a forward and reverse direction with an amplitude A at a frequency f. For continuous measurements, the relative optical path delay between two arms of the interferometer is alternately monotonically increased and monotonically decreased by a distance sufficient to generate a series of interference signals indicative of retardation. In operation, the interference signals are stored in a sequential data file with the first data point being defined as the origin "zero" distance. A distance file is created using an accumulated total measurement distance as the x-axis. As illustrated in FIG. 5, the zero-crossing point is located 100 μm from the start of the measurement.

Figure 9:
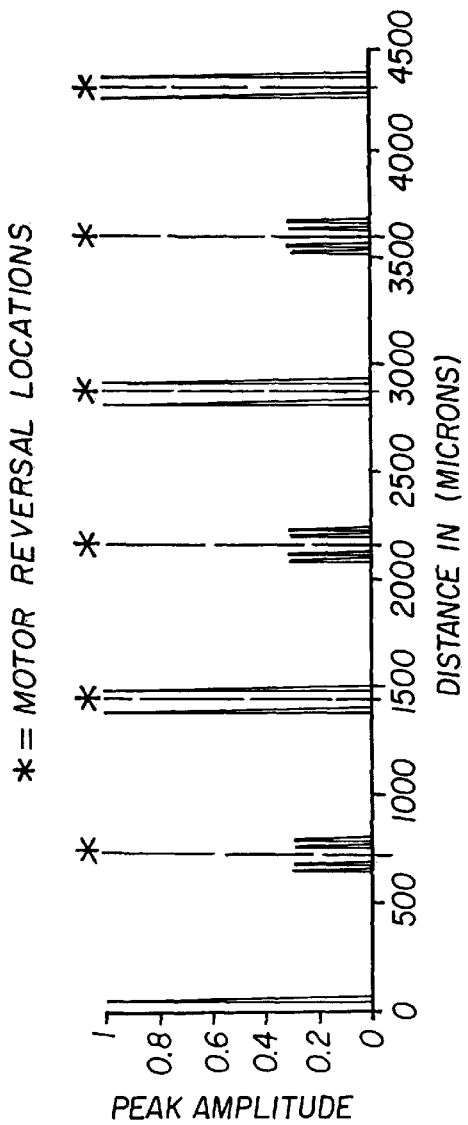
FIG. 9 shows an averaged absolute value of an interference signal illustrating repetitive measurements.
Figure 10:
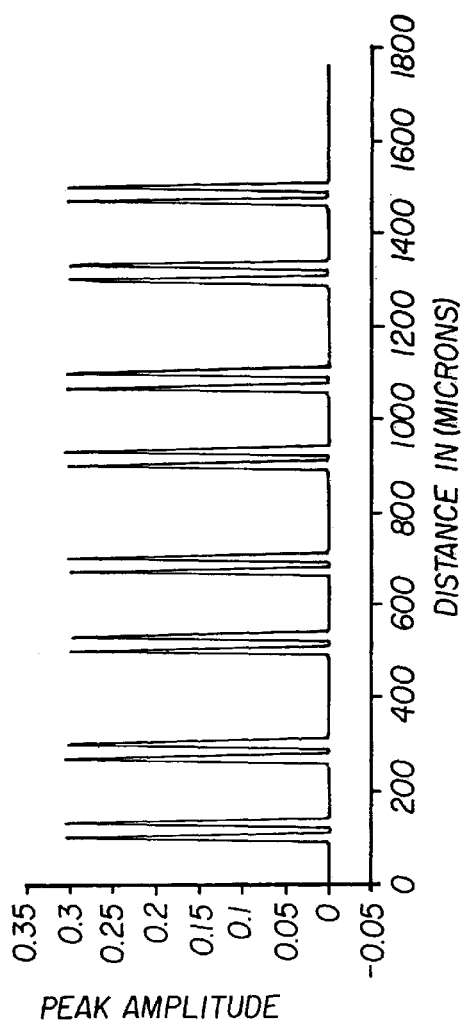
FIG. 10 shows an averaged absolute value of an interference signal illustrating repetitive measurements.
Figure 11:
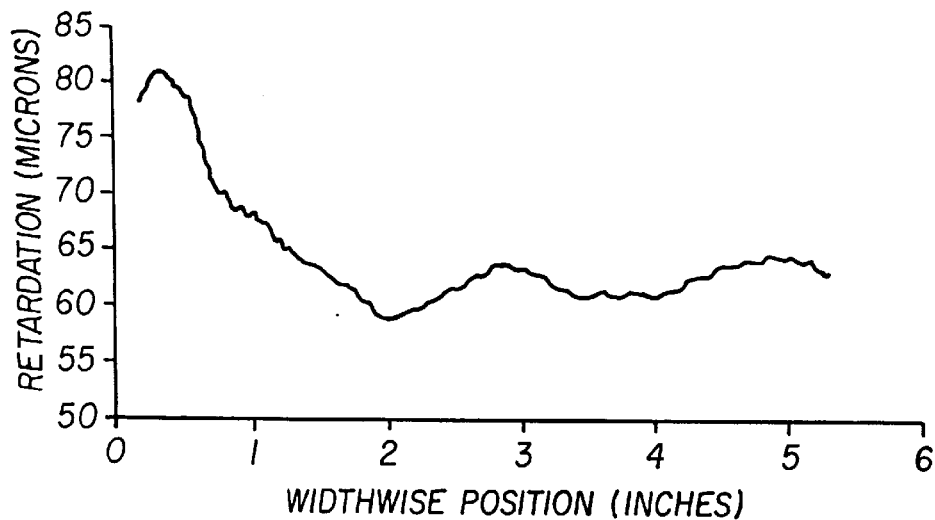
FIG. 11 shows a widthwise retardation profile for a particular sample.

An example of a repetitive measurement is now provided wherein the optical thickness of the sample is known to be between 550 and 600 and the retardation is known to be between 20 and 40. Referring first to FIG. 9, if both optical thickness and retardation are to be measured, the interferometer must travel a relative optical path delay difference sufficient to observe all three packets. As such, the measurement starts from below the zero-crossing peak and increases beyond the distances $\eta_1 t$ and $\eta_2 t$. The travel direction is then reversed. Accordingly, the optical path delay sequence is started from below the zero-crossing (for example, from 50 μm below the zero-crossing) to beyond 640 μm (for example, about 50 μm beyond to 690 μm) above the zero-crossing (640=600+40=maximum optical thickness plus the maximum retardation). The traversing motor of the interferometer would then be reversed and the same distance traversed. The repeat peak pattern of the interference signal is illustrated in FIG. 9. Alternately, the measurement can be made about the distances $\eta_1 t$ and $\eta_2 t$. The traverse direction changes between each pair of peaks, resulting in an interference signal as shown in FIG. 10. The distance between each set of adjacent $\eta_1 t$ and $\eta_2 t$ peaks is the retardation of the sample. FIG. 11 provides an illustration of a resulting widthwise retardation profile for a particular sample.

If sample 12 is comprised of multiple layers, the method of the present invention may be employed. The interferogram will comprise additional packets requiring analysis. Each additional packet will represent a surface of one of the layers and a correspondence will need to be made between each packet and the layer of the multi-layer sample. Reference is made to U.S. Pat. Nos. 5,757,485 (Marcus et al) and 5,757,486 (Marcus et al), commonly assigned and incorporated herewith.

Figure 12:
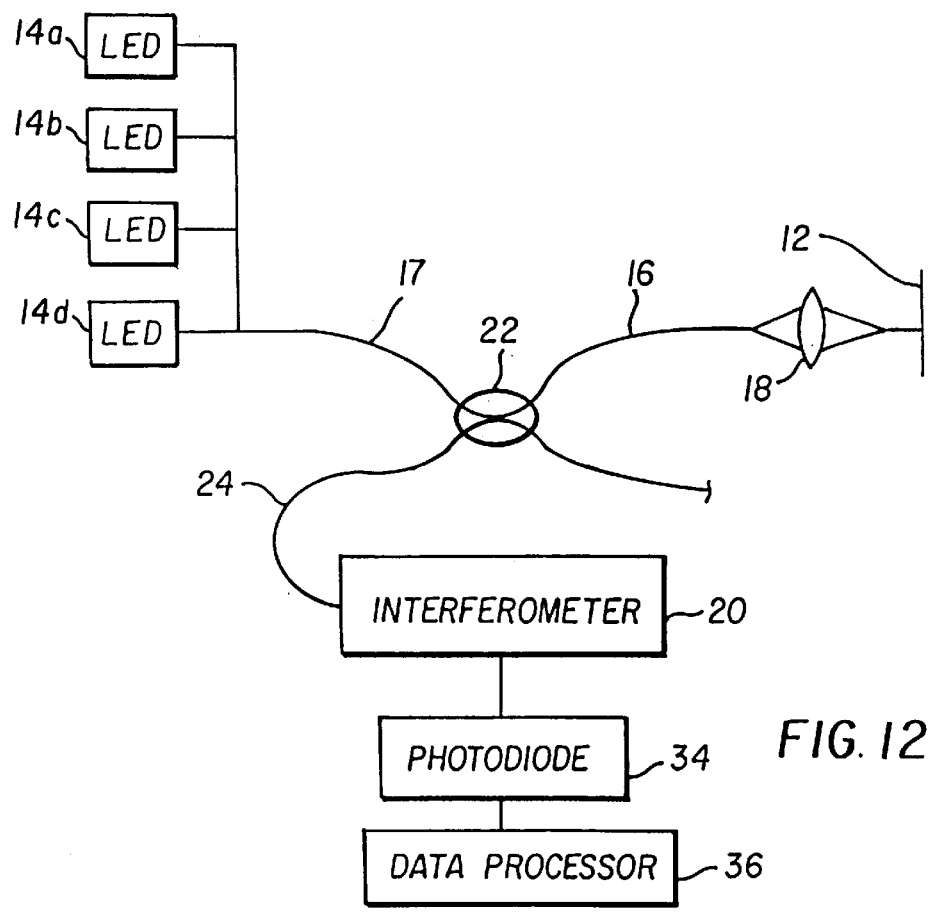
FIG. 12 shows a block diagram of the apparatus of FIG. 1 having multiple light sources.
Figure 13A:
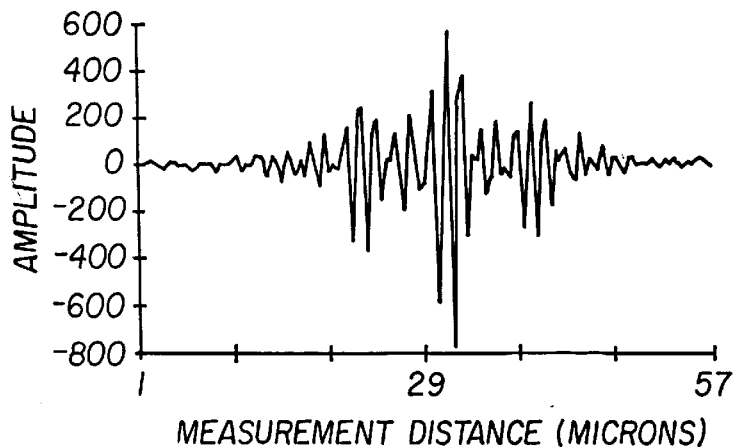
FIGS. 13a and 13b show a zero-crossing interferogram for four wavelength broadband light sources and a standard instrument light source, respectively.
Figure 13B:
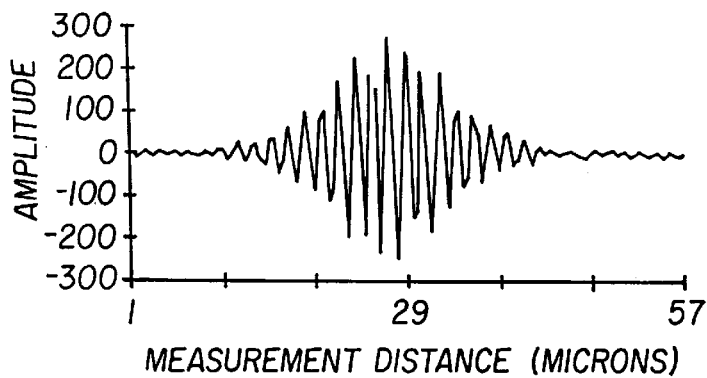

With a single broadband LED light source 14 of 1300 nm center wavelength and 60 nm bandwidth, the method of the present invention has provided measurement repeatability of within 0.050 μm for samples with a peak separation greater than 20 μm. The coherence length of the single wavelength LED light source is approximately 12.5 μm, whereby overlaps in the peaks occur as the retardation magnitude decreases, particularly below about 20 μm. Multiple light sources improve the spatial resolution of the measurement by the shorter coherence length light sources. Combining broadband LEDs with different central wavelengths can provide an effective shorter coherence length light source. FIG. 12 illustrates the combining of 4 broadband light sources 14a14 14d having the characteristics identified in Table I. The four wavelength source has an effective coherence length on the order of 3 μm. FIG. 13a illustrates a zero-crossing interferogram for the 4 wavelength broadband light source, while FIG. 13b illustrates a zero-crossing interferogram using a single 1310 nm, 12.5 μm coherence length light source.

Figure 14:
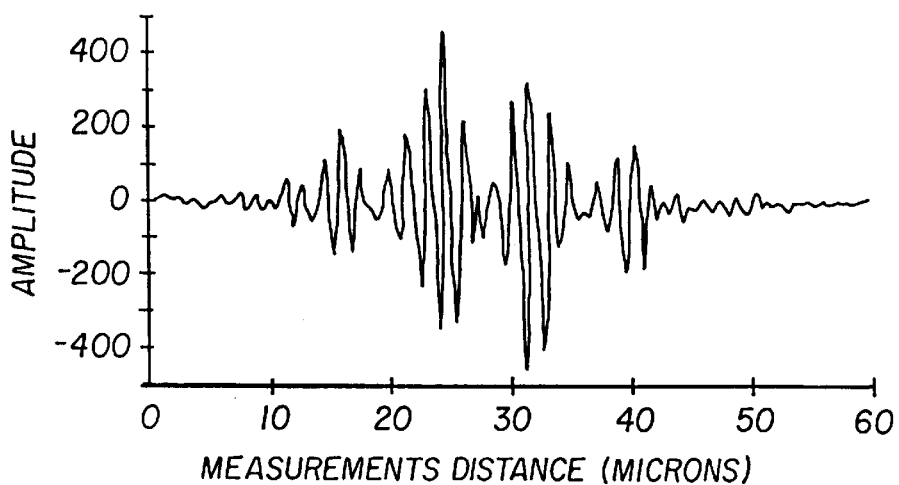
FIG. 14 shows a retardation interferogram using a multiple wavelength light source for a material having low retardation.

FIG. 14 shows a retardation interferogram for a sample with 7 microns of retardation measured with the multiple wavelength light source. With the multiple light sources, a narrow center peak occurs with a pair of lower intensity sidelobes. For low retardation magnitudes, a pair of interferogram peaks occur within the low coherence length interval of the low coherence light source. The multiple light source configuration has provided measurement repeatability of within 0.050 μm for samples with a peak separation greater than 3 μm with a standard measurement rate of 20 Hz.

TABLE I

| Center Wavelength $\lambda_{nc}$ nm | Coherence Length $L_c$ μm | Relative Amplitude A |
|---|---|---|
| 1310.70 | 16.61 | 693 |
| 1418.64 | 15.7 | 642 |
| 1545.96 | 19.9 | 710 |
| 1663.24 | 22.9 | 185 |

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for determining the optical retardation of an anisotropic material having at least two optical interfaces, comprising the steps of:

directing a beam of light toward a sample of the material;

collecting a portion of the light reflected from the optical interfaces of the material;

directing the collected light toward an interferometer;

generating an interference signal representative of the collected light; and analyzing the interference signal to determine a retardation magnitude comprising the steps of:

determining the first peak of the interference signal corresponding to a zero-crossing position;

determining the first distance between a second peak and the first peak, the first distance corresponding to $\eta_1 t$ wherein t is thickness and $\eta_1$ is the index of refraction in a first direction;

determining the second distance between a third peak and the first peak, the second distance corresponding to $\eta_2 t$ wherein t is thickness and $\eta_2$ is the index of refraction in a second direction perpendicular to the first direction; and determining the retardation magnitude by determining the difference between the first distance and the second distance.

2. The method according to claim 1 further comprising the step of varying a relative optical path delay between two arms of the interferometer by a distance sufficient to generate the interference signal.

3. The method according to claim 1 further comprising the step of alternately monotonically increasing and decreasing a relative optical path delay between two arms of the interferometer by a distance sufficient to generate a plurality of the interference signals.

4. The method according to claim 1 wherein the material has a width and a length, and the method further comprises the steps of moving the material in a direction along its length, and repeating the steps of directing, collecting, directing, generating, and analyzing to provide a lengthwise profile of retardation.

5. The method according to claim 1 wherein the material has a width and a length, and the method further comprises the steps of moving the beam of light in a direction along the width of the material, and repeating the steps of directing, collecting, directing, generating, and analyzing to provide a widthwise profile of retardation.

6. A method for determining the optical retardation of an anisotropic material having at least two optical interfaces, comprising the steps of:

directing a beam of light from multiple wavelength light sources toward a sample of the material;

collecting a portion of the light reflected from the optical interfaces of the material;

directing the collected light toward an interferometer;

generating an interference signal representative of the collected light; and analyzing the interference signal to determine a retardation magnitude comprising the steps of:

determining the first peak of the interference signal corresponding to a zero-crossing position;

determining the first distance between a second peak and the first peak, the first distance corresponding to $\eta_1 t$ wherein t is thickness and $\eta_1$ is the index of refraction in a first direction;

determining the second distance between a third peak and the first peak, the second distance corresponding to $\eta_2 t$ wherein t is thickness and $\eta_2$ is the index of refraction in a second direction perpendicular to the first direction; and determining the retardation magnitude by determining the difference between the first distance and the second distance.

7. The method according to claim 6 further comprising the step of varying a relative optical path delay between two arms of the interferometer by a distance sufficient to generate the interference signal.

8. The method according to claim 6 further comprising the step of alternately monotonically increasing and decreasing a relative optical path delay between two arms of the interferometer by a distance sufficient to generate a plurality of the interference signals.

9. The method according to claim 6 wherein the material has a width and a length, and the method further comprises the steps of moving the material in a direction along its length, and repeating the steps of directing, collecting, directing, generating, and analyzing to provide a lengthwise profile of retardation.

10. The method according to claim 6 wherein the material has a width and a length, and the method further comprises the steps of moving the beam of light in a direction along the width of the material, and repeating the steps of directing, collecting, directing, generating, and analyzing to provide a widthwise profile of retardation.

11. A method for determining the optical retardation of an oriented polymeric material having at least two optical interfaces, comprising the steps of:

directing a beam of light toward a sample of the material;

collecting a portion of the light reflected from the optical interfaces of the material;

directing the collected light toward an interferometer;

generating an interference signal representative of the collected light; and analyzing the interference signal to determine a retardation magnitude comprising the steps of:

determining the first peak of the interference signal corresponding to a zero-crossing position;

determining the first distance between a second peak and the first peak, the first distance corresponding to $\eta_1 t$ wherein t is thickness and $\eta_1$ is the index of refraction in a first direction;

determining the second distance between a third peak and the first peak, the second distance corresponding to $\eta_2 t$ wherein t is thickness and $\eta_2$ is the index of refraction in a second direction perpendicular to the first direction; and determining the retardation magnitude by determining the difference between the first distance and the second distance.

* * * * *